US012576476B2

(12) United States Patent
Dhandapani et al.

(10) Patent No.: US 12,576,476 B2
(45) Date of Patent: Mar. 17, 2026

(54) PAD CONDITIONER CUT RATE MONITORING

(71) Applicant: Applied Materials, Inc., Santa Clara, CA (US)

(72) Inventors: Sivakumar Dhandapani, San Jose, CA (US); Sameer Deshpande, Santa Clara, CA (US); Jason Garcheung Fung, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 407 days.

(21) Appl. No.: 18/167,015

(22) Filed: Feb. 9, 2023

(65) Prior Publication Data

US 2023/0182264 A1     Jun. 15, 2023

Related U.S. Application Data

(63) Continuation of application No. 16/294,604, filed on Mar. 6, 2019, now Pat. No. 11,577,362.

(Continued)

(51) Int. Cl.
  *B24B 49/10*       (2006.01)
  *B24B 37/013*      (2012.01)
  (Continued)

(52) U.S. Cl.
  CPC .......... *B24B 49/105* (2013.01); *B24B 37/013* (2013.01); *B24B 37/04* (2013.01);
  (Continued)

(58) Field of Classification Search
  CPC ..... B24B 37/013; B24B 37/04; B24B 37/042; B24B 37/105; B24B 37/12; B24B 37/20;
  (Continued)

(56) References Cited

U.S. PATENT DOCUMENTS

| | | | |
|---|---|---|---|
| 5,664,987 | A | 9/1997 | Renteln |
| 6,186,864 | B1 | 2/2001 | Fisher, Jr. et al. |

(Continued)

FOREIGN PATENT DOCUMENTS

| | | |
|---|---|---|
| CN | 1505554 | 6/2004 |
| CN | 1859998 | 11/2006 |

(Continued)

OTHER PUBLICATIONS

International Search Report and Written Opinion in International Appln. No. PCT/US2019/021041, dated Jun. 20, 2019, 11 pages.

(Continued)

*Primary Examiner* — Robert F Neibaur
(74) *Attorney, Agent, or Firm* — Fish & Richardson P.C.

(57)     ABSTRACT

An apparatus for chemical mechanical polishing includes a platen having a surface to support a polishing pad, a carrier head to hold a substrate against a polishing surface of the polishing pad, a pad conditioner to hold a conditioning disk against the polishing surface, an in-situ polishing pad thickness monitoring system, and a controller. The controller is configured to store data associating each of a plurality of conditioner disk products with a respective threshold value, receive an input selecting a conditioner disk product from the plurality of conditioner disk products, determine a particular threshold value associated with the selected conditioner disk product, receive a signal from the monitoring system, generate a measure of a pad cut rate from the signal, and generate an alert if the pad cut rate falls beyond the particular threshold value.

13 Claims, 6 Drawing Sheets

Related U.S. Application Data

(60) Provisional application No. 62/643,134, filed on Mar. 14, 2018.

(51) Int. Cl.

| | | |
|---|---|---|
| *B24B 37/04* | (2012.01) | |
| *B24B 53/017* | (2012.01) | |
| *G01B 7/06* | (2006.01) | |
| *G01N 27/90* | (2021.01) | |

(52) U.S. Cl.
CPC ............ *B24B 53/017* (2013.01); *G01B 7/107* (2013.01); *G01N 27/9006* (2013.01)

(58) Field of Classification Search
CPC ....... B24B 37/34; B24B 37/005; B24B 49/10; B24B 49/105; B24B 49/183; B24B 53/017; G01B 7/10; G01B 7/105; B05B 23/0283; B05B 2219/45232
USPC ........ 451/5, 8, 443, 290, 72; 438/5; 700/164
See application file for complete search history.

(56) References Cited

U.S. PATENT DOCUMENTS

| | | | | |
|---|---|---|---|---|
| 6,494,765 | B2 * | 12/2002 | Gitis | ...................... B24B 49/10 |
| | | | | 451/287 |
| 6,966,816 | B2 | 11/2005 | Swedek et al. | |
| 7,004,825 | B1 | 2/2006 | Taylor et al. | |
| 7,189,140 | B1 | 3/2007 | Shugrue et al. | |
| 7,220,163 | B2 | 5/2007 | Shin | |
| 8,043,870 | B2 | 10/2011 | Manens et al. | |
| 8,221,193 | B2 * | 7/2012 | Chang | ................... B24B 53/017 |
| | | | | 451/6 |
| 9,308,618 | B2 | 4/2016 | Benvegnu | |
| 9,636,797 | B2 | 5/2017 | Xu et al. | |
| 11,504,821 | B2 | 11/2022 | Dhandapani et al. | |
| 11,577,362 | B2 | 2/2023 | Dhandapani et al. | |
| 2003/0060127 | A1 | 3/2003 | Kaushal et al. | |
| 2004/0176014 | A1 | 9/2004 | Bennett et al. | |
| 2004/0242122 | A1 | 12/2004 | Kramer et al. | |
| 2005/0070209 | A1 | 3/2005 | Marxsen et al. | |
| 2008/0311834 | A1 | 12/2008 | Lafon et al. | |
| 2012/0064800 | A1 * | 3/2012 | Watanabe | ............. B24B 37/005 |
| | | | | 451/5 |
| 2012/0270477 | A1 | 10/2012 | Nangoy et al. | |
| 2013/0122783 | A1 * | 5/2013 | Menk | .................... B24B 37/042 |
| | | | | 451/443 |
| 2013/0288572 | A1 | 10/2013 | Benvegnu | |
| 2014/0027407 | A1 | 1/2014 | Deshpande et al. | |
| 2014/0113527 | A1 | 4/2014 | Lindsay et al. | |
| 2015/0034608 | A1 | 2/2015 | Mori et al. | |
| 2015/0118765 | A1 | 4/2015 | Xu et al. | |
| 2015/0140900 | A1 | 5/2015 | Lee et al. | |
| 2018/0056476 | A1 | 3/2018 | Zhang et al. | |
| 2019/0283208 | A1 | 9/2019 | Dhandapani et al. | |

FOREIGN PATENT DOCUMENTS

| | | |
|---|---|---|
| CN | 102398210 | 4/2012 |
| CN | 105659363 | 6/2016 |
| CN | 106062933 | 10/2016 |
| CN | 106217234 A | 12/2016 |
| JP | S61-252053 | 11/1986 |
| JP | 2007-266547 | 10/2007 |
| JP | 2008-103517 | 5/2008 |
| JP | 2011-519747 | 7/2011 |
| JP | 2012-056029 | 3/2012 |
| JP | 2015-030001 A | 2/2015 |
| JP | 2015-519740 | 7/2015 |
| TW | 201350261 | 12/2013 |
| WO | WO 2015/066058 | 5/2015 |

OTHER PUBLICATIONS

Office Action in Japanese Appln No. 2020547192, dated Oct. 4, 2022, 10 pages (with English Translation).

Office Action in Chinese Appln. No. 201980005305.2, dated Feb. 23, 2022, 12 pages (with English Translation).

Office Action in Chinese Appln. No. 201980005305.2, dated Jun. 28, 2023, 11 pages (with English Translation).

Office Action in Taiwanese Appln. No. 108107782, dated May 23, 2023, 10 pages (with English Search Report).

Office Action in Japanese Appln. No. 2023-085968, dated Jul. 30, 2024, 9 pages (with English translation).

Office Action in Chinese Appln. No. 202311178955.1, mailed on Jul. 25, 2025, 12 pages (with English translation).

Office Action in Japanese Appln. No. 2023-085968, dated Mar. 18, 2025, 6 pages (with English translation).

* cited by examiner

PAD CONDITIONER CUT RATE MONITORING

CROSS-REFERENCE TO RELATED APPLICATIONS

This application is a continuation of U.S. application Ser. No. 16/294,604, filed on Mar. 6, 2019, which claims priority to U.S. Application Ser. No. 62/643,134, filed on Mar. 14, 2018, the disclosure of which is incorporated by reference.

TECHNICAL FIELD

The present disclosure relates to monitoring the cut rate through a polishing pad by a pad conditioner in chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, one fabrication step involves depositing a conductive filler layer on a patterned insulative layer to fill the trenches or holes in the insulative layer. The filler layer is then polished until the raised pattern of the insulative layer is exposed. After planarization, the portions of the conductive filler layer remaining between the raised pattern of the insulative layer form vias, plugs and lines that provide conductive paths between thin film circuits on the substrate.

Chemical mechanical polishing (CMP) is one accepted method of planarization. This planarization method typically requires that the substrate be mounted on a carrier head. The exposed surface of the substrate is placed against a rotating polishing pad. The carrier head provides a controllable load on the substrate to push it against the polishing pad. A polishing liquid, such as slurry with abrasive particles, is supplied to the surface of the polishing pad.

After the CMP process is performed for a certain period of time, the surface of the polishing pad can become glazed due to accumulation of slurry by-products and/or material removed from the substrate and/or the polishing pad. Glazing can reduce the polishing rate or increase non-uniformity on the substrate.

Typically, the polishing pad is maintained in with a desired surface roughness (and glazing is avoided) by a process of conditioning with a pad conditioner. The pad conditioner is used to remove the unwanted accumulations on the polishing pad and regenerate the surface of the polishing pad to a desirable asperity. Typical pad conditioners include an abrasive conditioner disk. Such a conditioner disk can be, for example, embedded with diamond abrasive particles which can be scraped against the polishing pad surface to retexture the pad. However, the conditioning process also tends to wear away the polishing pad. Consequently, after a certain number of cycles of polishing and conditioning, the polishing pad needs to be replaced.

SUMMARY

An apparatus for chemical mechanical polishing includes a platen having a surface to support a polishing pad, a carrier head to hold a substrate against a polishing surface of the polishing pad, a pad conditioner to hold a conditioning disk against the polishing surface, an in-situ polishing pad thickness monitoring system, and a controller. The controller is configured to store data associating each of a plurality of conditioner disk products with a respective threshold value, receive an input selecting a conditioner disk product from the plurality of conditioner disk products, determine a particular threshold value associated with the selected conditioner disk product, receive a signal from the monitoring system, generate a measure of a pad cut rate from the signal, and generate an alert if the pad cut rate falls beyond the particular threshold value.

Certain implementations can include one or more of the following advantages. The thickness of the polishing pad can be determined, and a cut rate through the polishing pad can be monitored. If the cut rate deviates from a normal rate, this can indicate effectiveness of the conditioner disk is being reduced. The conditioner disk can be replaced when its effectiveness is reduced, thereby improving pad conditioning uniformity, increasing substrate polishing rates, and reducing within-wafer non-uniformity (WIWNU) and defects. Pressure on a conditioning disk can be adjusted such that the pad wear rate is maintained substantially constant.

The details of one or more implementations are set forth in the accompanying drawings and the description below. Other aspects, features and advantages will be apparent from the description and drawings, and from the claims.

BRIEF DESCRIPTION OF DRAWINGS

Like reference symbols in the various drawings indicate like elements.

DETAILED DESCRIPTION

As noted above, the conditioning process also tends to wear away the polishing pad. The polishing pad typically has grooves to carry slurry, and as the pad is worn away, these grooves become shallower and polishing effectivity degrades. Consequently, after a certain number of cycles of polishing and conditioning, the polishing pad needs to be replaced. Typically this is done simply by replacing the polishing pad after a set number of substrates have been polished, e.g., after 500 substrates.

Unfortunately, the rate of pad wear need not be consistent, so the polishing pad might last more or less than the set number, which can result in wasted pad life or non-uniform polishing, respectively. In particular, over the lifetime of the polishing pad, the abrasive material, e.g., diamonds, on the conditioning disk are gradually worn. As a result, the disk's conditioning efficiency can fall over time. Thus the surface texture generated conditioning changes and can degrade over the lifetime of a polishing pad and from pad-to-pad. This changes the polishing behavior.

Similarly, the conditioner disk tends to loose effectiveness over time. Without being limited to any particularly theory, the abrasive particles on the conditioner are also worn and loose sharpness. Thus, the pad conditioner also needs to be replaced periodically. Again, this is done simply by replacing the conditioning disk after a set number of substrates have been polished, e.g., after 1000 substrates (replacement rates for the pad and conditioning disk are consumable and process dependent).

The polishing pad thickness can be measured in-situ, e.g., with a sensor installed on the conditioner system, carrier head or platen. The polishing pad can be replaced if the measured pad thickness falls below a threshold. In addition, a running pad cut rate (also referred to as a pad wear rate) can be calculated from the pad thickness measurements. The pad cut rate can be monitored for variation and noise. In addition, the conditioner disk can be replaced if the measured pad wear rate falls below a threshold.

One difficulty is that the thickness measurement can be subject to significant noise. Some contributions to the noise can be cyclical, e.g., due to the sensor passing over different portions of the polishing pad. Another contribution to noise is a "wet idle" problem; when the polishing system starts running after wet idle, an inductive sensor will tend to measure the polishing pad thickness as artificially large. This produces an incorrect estimate of the pad cut rate.

However, by applying a predictive filter, e.g., a Kalman filter, to the pad thickness measurements, this noise can be reduced and the wear rate of the pad can be calculated more accurately.

Figure 1A:
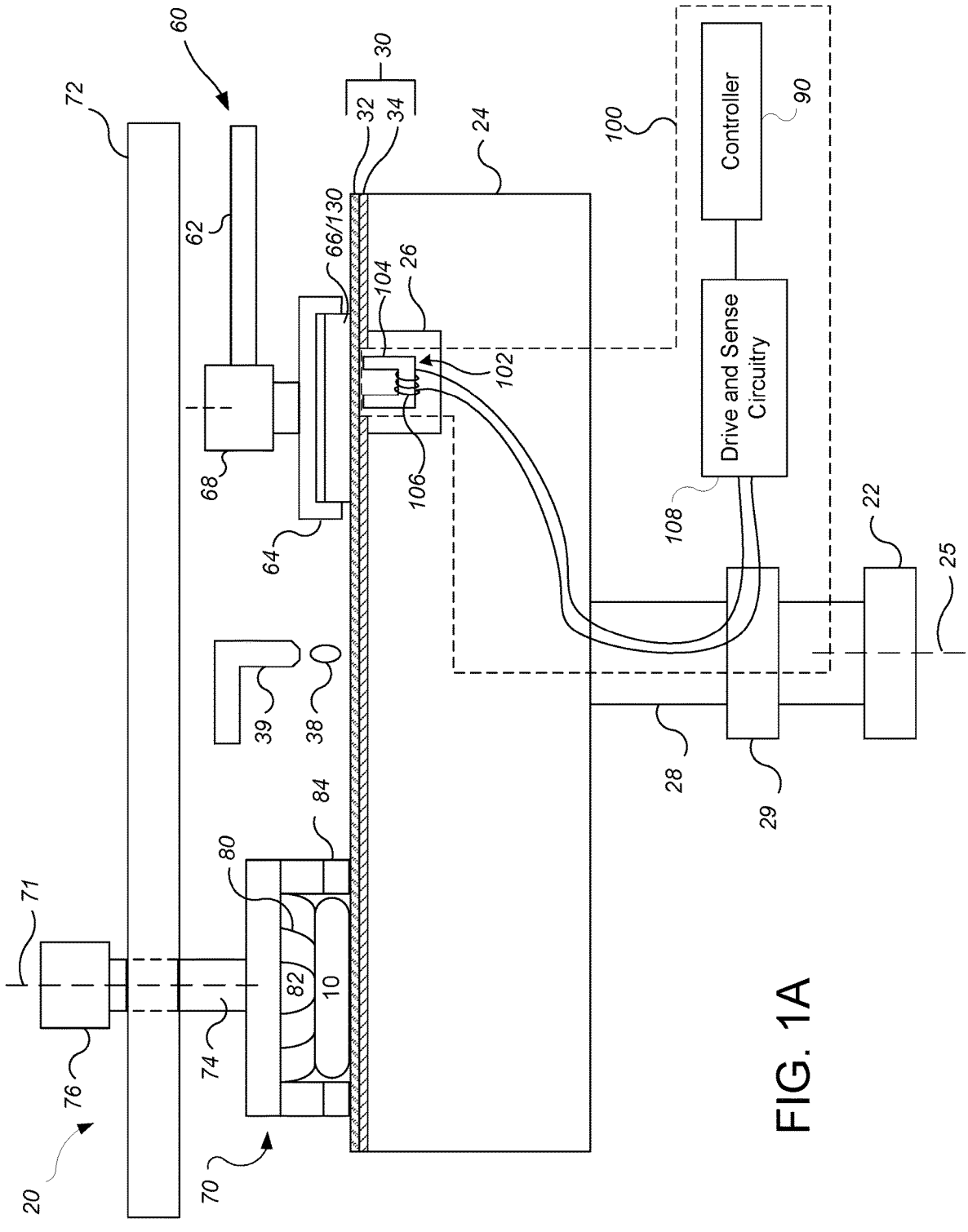
FIG. 1A is a schematic side view, partially cross-sectional, of a chemical mechanical polishing system that includes a sensor configured to detect pad layer thickness.

FIG. 1A illustrates an example of a polishing system 20 of a chemical mechanical polishing apparatus. The polishing system 20 includes a rotatable disk-shaped platen 24 on which a polishing pad 30 is situated. The platen 24 is operable to rotate about an axis 25. For example, a motor 22 can turn a drive shaft 28 to rotate the platen 24. The polishing pad 30 can be a two-layer polishing pad with an outer layer 34 and a softer backing layer 32.

The polishing system 20 can include a supply port or a combined supply-rinse arm 39 to dispense a polishing liquid 38, such as slurry, onto the polishing pad 30.

The polishing system 20 can also include a polishing pad conditioner 60 to abrade the polishing pad 30 to maintain the polishing pad 30 in a consistent abrasive state. The polishing pad conditioner 60 includes a base, an arm 62 that can sweep laterally over the polishing pad 30, and a conditioner head 64 connected to the base by the arm 64. The conditioner head 64 brings an abrasive surface, e.g., a lower surface of a disk 66 held by the conditioner head 64, into contact with the polishing pad 30 to condition it. The abrasive surface can be rotatable, and the pressure of the abrasive surface against the polishing pad can be controllable.

In some implementations, the arm 62 is pivotally attached to the base and sweeps back and forth to move the conditioner head 64 in an oscillatory sweeping motion across polishing pad 30. The motion of the conditioner head 64 can be synchronized with the motion of carrier head 70 to prevent collision.

Vertical motion of the conditioner head 64 and control of the pressure of conditioning surface on the polishing pad 30 can be provided by a vertical actuator 68 above or in the conditioner head 64, e.g., a pressurizable chamber positioned to apply downward pressure to the conditioner head 64. Alternatively, the vertical motion and pressure control can be provided by a vertical actuator in the base that lifts the entire arm 62 and conditioner head 64, or by a pivot connection between the arm 62 and the base that permits a controllable angle of inclination of the arm 62 and thus height of the conditioner head 64 above the polishing pad 30.

The conditioning disk is 66 can be a metal disk coated with abrasive particles, e.g., diamond grit. In particular, the conditioning disk 66 can be a conductive body.

The carrier head 70 is operable to hold a substrate 10 against the polishing pad 30. The carrier head 70 is suspended from a support structure 72, e.g., a carousel or a track, and is connected by a drive shaft 74 to a carrier head rotation motor 76 so that the carrier head can rotate about an axis 71. Optionally, the carrier head 70 can oscillate laterally, e.g., on sliders on the carousel or track 72; or by rotational oscillation of the carousel itself. In operation, the platen is rotated about its central axis 25, and the carrier head is rotated about its central axis 71 and translated laterally across the top surface of the polishing pad 30.

The carrier head 70 can include a flexible membrane 80 having a substrate mounting surface to contact the back side of the substrate 10, and a plurality of pressurizable chambers 82 to apply different pressures to different zones, e.g., different radial zones, on the substrate 10. The carrier head can also include a retaining ring 84 to hold the substrate.

The polishing system 20 includes an in-situ polishing pad thickness monitoring system 100 that generates a signal that represents a thickness of the polishing pad. In particular, the in-situ polishing pad thickness monitoring system 100 can be an electromagnetic induction monitoring system. The electromagnetic induction monitoring system can operate either by generation of eddy-current in a conductive layer or generation of current in a conductive loop. In operation, the polishing system 20 can use the monitoring system 100 to determine whether the conditioner disk and/or polishing pad needs to be replaced.

In some implementations, the monitoring system includes a sensor 102 installed in the recess 26 in the platen. The sensor 102 can include a magnetic core 104 positioned at least partially in the recess 26, and at least one coil 106 wound around the core 104. Drive and sense circuitry 108 is electrically connected to the coil 106. The drive and sense circuitry 108 generates a signal that can be sent to a controller 90.

Although illustrated as outside the platen 24, some or all of the drive and sense circuitry 48 can be installed in the platen 24. A rotary coupler 29 can be used to electrically connect components in the rotatable platen, e.g., the coil 106, to components outside the platen, e.g., the drive and sense circuitry 108.

For the inductive monitoring system with a sensor 102 in the platen, a conductive body 130 is placed in contact with the top surface, i.e., the polishing surface, of the polishing pad 130. Thus, the conductive body 130 is located on the far side of the polishing pad 130 from the sensor 102. In some implementations, the conductive body is the conditioner disk 66 (see FIG. 1A). In some implementations the conductive body 130 can have one or more apertures therethrough, e.g., the body can be a loop. In some implementations the conductive body is a solid sheet without apertures. Either of these can be part of the conditioner disk 66.

As the platen 24 rotates, the sensor 102 sweeps below the conductive body 130. By sampling the signal from the circuitry 108 at a particular frequency, the monitoring system 100 generates measurements at a plurality of locations across the conductive body 130, e.g., across the conditioner disk 66. For each sweep, measurements at one or more of the locations can be selected or combined.

Figure 3:
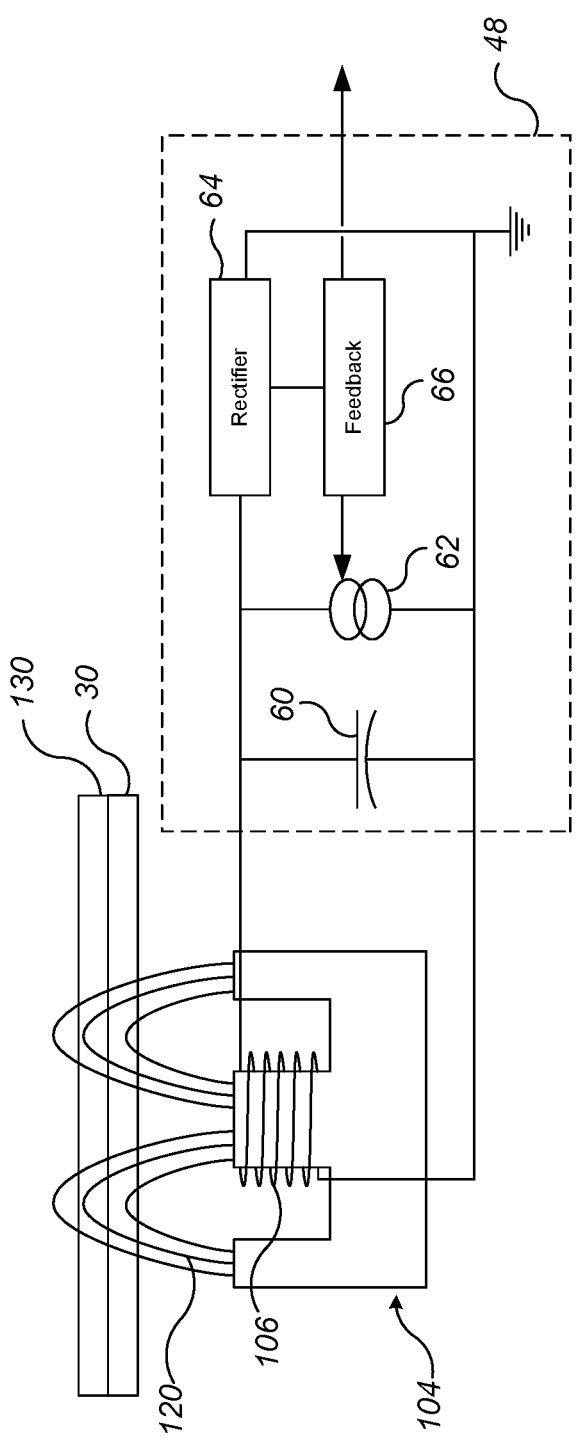
FIG. 3 is a schematic circuit diagram of a drive system for an electromagnetic induction monitoring system.

Referring to FIG. 3, the coil 106 generates a magnetic field 120. When the magnetic field 120 reaches the conductive body 130, the magnetic field 120 can pass through and generate a current (e.g., if the body 130 is a loop), and/or the magnetic field create an eddy-current (e.g., if the body 130 is a sheet). This creates an effective impedance, which can be measured by the circuitry 108, thus generating a signal representative of the thickness of the polishing pad 30.

A variety of configurations are possible for the drive and sense circuitry 108. For example, the drive and sense circuitry 108 can include a marginal oscillator, and the drive current for the marginal oscillator to maintain a constant amplitude could be used for a signal. Alternatively, the drive coil 106 could be driven at a constant frequency and the amplitude or phase (relative to the driving oscillator) of the current from the sense coil could be used for a signal.

Figure 1B:
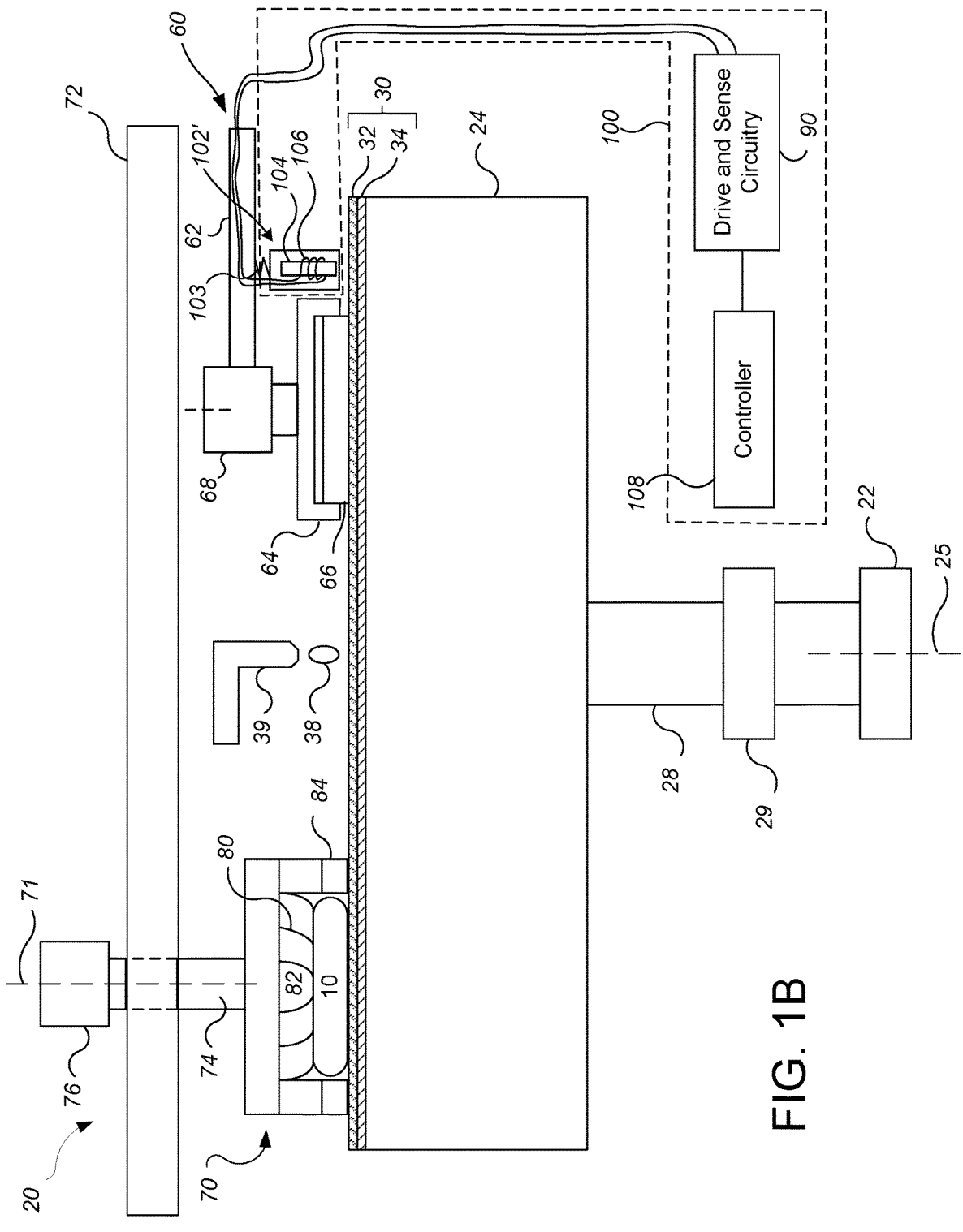
FIG. 1B is a schematic side view, partially cross-sectional, of another implementation of a chemical mechanical polishing system that includes a sensor to detect pad layer thickness.
Figure 2:
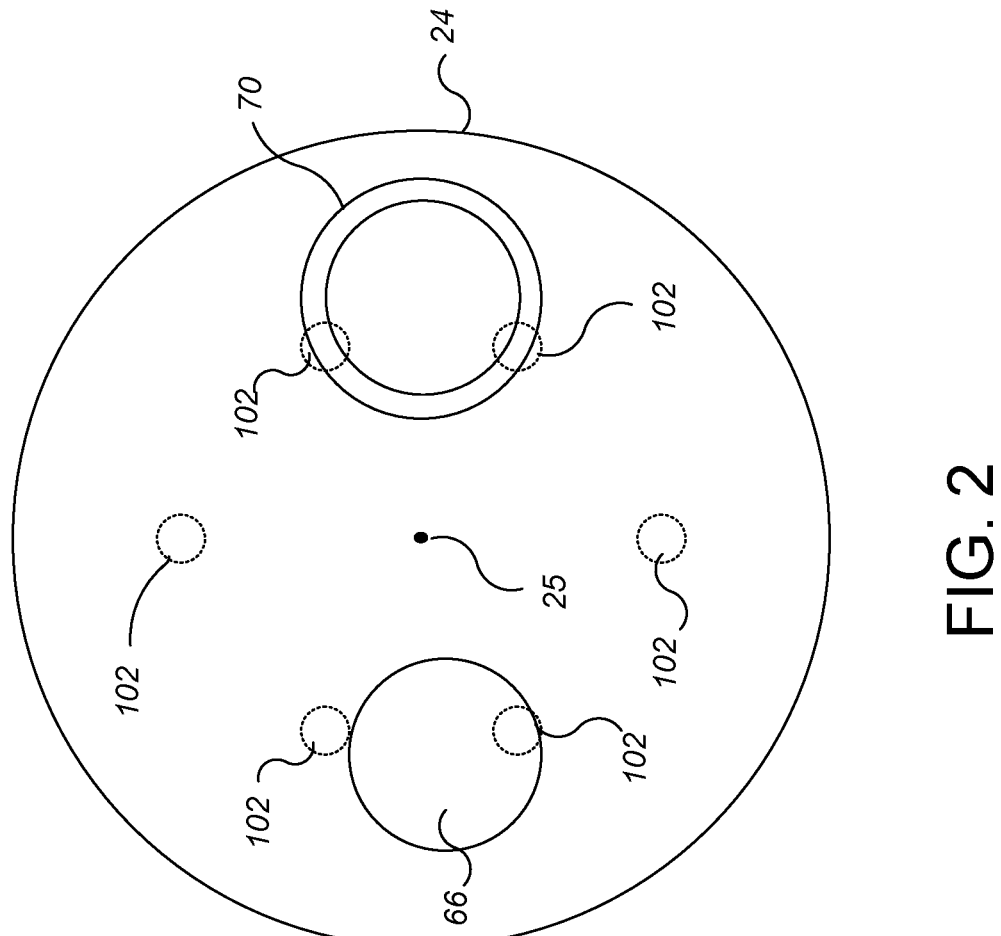
FIG. 2 is schematic top view of a chemical mechanical polishing system.

Alternatively or in addition to a sensor in the platen, as shown in FIG. 1B, the monitoring system 100 can include a sensor 102' located above the polishing pad 30. For example, a pad thickness sensor 102' could be positioned in the conditioning head 64, on the conditioner arm 62, or on the carrier head 70. The sensor 102' can be biased, e.g., by a spring 103, into contact with the polishing surface 34 of the polishing pad 30. Also, rather than contacting the polishing surface 34, the sensor 102' can be suspended above the polishing pad 30. For example, if the sensor 120' is suspended from the conditioner arm 62, and the conditioner head 64 rests on the polishing pad 30, then the distance between the sensor 120' and the platen 24 will depend on the thickness of the polishing pad 30. In any of these cases, the signal generated will depend on the distance of the sensor to the conductive body of the platen 24, and thus will depend on the thickness of the polishing pad 30.

The pad thickness sensor 102' can also be an electromagnetic induction monitoring system. In this case, the sensor 102' can be similar to sensor 102, and include a magnetic core 104, at least one coil 106 wound around the core 104, and drive and sense circuitry 108 electrically connected to the coil 106. The magnetic field 120 from the core 104 can pass through the polishing pad and generate an eddy-current in an underlying conductive body, e.g., the platen 24. The effective impedance depends on the distance between the sensor 102 and the platen 24, and this can be sensed by the circuitry 108, thus providing a measurement of the thickness of the polishing pad 30.

Alternatively, the sensor 102' can be a contact profilometer.

If the sensor 102 is positioned above the polishing pad 30 and measures distance to the platen 24, then the sensor 102 will generate an effectively continuous signal that does not need significant processing.

Figure 4:
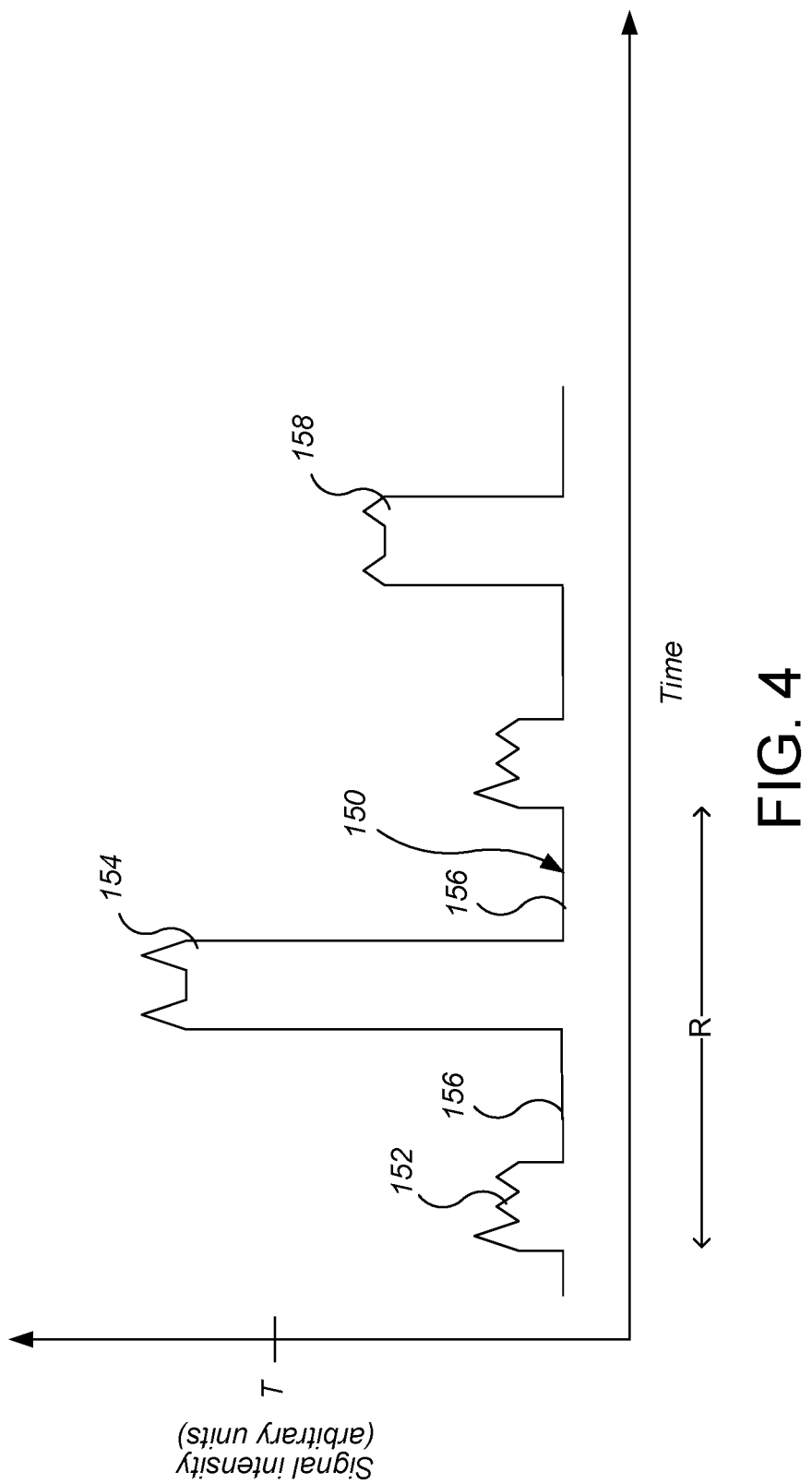
FIG. 4 is an illustrative graph of signal strength from a sensor over multiple rotations of the platen.

However, if the sensor 102 is installed in rotates with the platen 24 and measures distance to the conductive body 130, then the sensor 102 can generate data even when it is not below the conductive body 130. FIG. 4 illustrates a "raw" signal 150 from the sensor 102 over the course of two revolutions of the platen 24. A single revolution of the platen is indicated by the time period R.

The sensor 102 can be configured such that the closer the conductive body 130 (and thus the thinner the polishing pad 30), the stronger the signal strength. As shown in FIG. 4, initially the sensor 102 might be beneath the carrier head 70 and substrate 10. Since the metal layer on the substrate is thin, it creates only a weak signal, indicated by region 152. In contrast, when the sensor 102 is beneath the conductive body 130, the sensor 102 generates a strong signal, indicated by region 154. Between those times, the sensor 102 generates an even lower signal, indicated by regions 156.

Several techniques can be used to filter out the portion of the signal from the sensor 102 that do not correspond to the conductive body 130. The polishing system 20 can include a position sensor to sense when the sensor 102 is underneath the conductive body 120. For example, an optical interrupter can be mounted at a fixed location, and a flag can be attached to the periphery of the platen 24. The point of attachment and length of the flag is selected so that it signal that the sensor 102 is sweeping underneath the substrate conductive body 130. As another example, the polishing system 20 can include an encoder to determine the angular position of the platen 24, and use this information to determine when the sensor 102 is sweeping beneath the conductive body 130. In either case, the controller 90 can the exclude portions of the signal from periods where the sensor 102 is not below the conductive body 130. Similar techniques can be used if the sensor 102' is above the polishing pad 30 to filter out a portion of the signal that corresponds to the sensor 102' being positioned over a window or other recess in the platen 24.

Alternatively or in addition, the controller can simply compare the signal 150 to a threshold T (see FIG. 4) and exclude portions of the signal that do not meet the threshold T, e.g., are below the threshold T.

Due to sweep of the conditioner head 64 across the polishing pad 30, the sensor 102 may not pass cleanly below a center of the conductive body 130. For example, the sensor 102 might only pass across along an edge of the conductive body. In this case, since less conductive material is present, the signal strength will be lower, e.g., as shown by region 158 of the signal 150, and not a reliable indicator of the thickness of the polishing pad 30. An advantage of excluding portions of the signal that do not meet the threshold T is that the controller 90 an also exclude these unreliable measurements caused by the sensor 102 passing across along an edge of the conductive body 130.

In some implementations, for each sweep, the portion of the signal 150 that is not excluded can be averaged to generate an average signal strength for the sweep.

A controller 90, e.g., a general purpose programmable digital computer, receives the signal from the in-situ polishing pad thickness monitoring system 100, and can be configured to generate a measure of thickness of the polishing pad 30 from the signal. As noted above, due to the conditioning process, the thickness of the polishing pad changes over time, e.g., over the course of polishing tens or hundreds of substrates. Thus, over multiple substrates, the selected or combined measurements from the in-situ polishing pad thickness monitoring system 100 provide a time-varying sequence of values indicative of the change of thickness of the polishing pad 30.

The output of the sensor 102 can be a digital electronic signal (if the output of the sensor is an analog signal then it can be converted to a digital signal by an ADC in the sensor or the controller). The digital signal is composed of a sequence of signal values, with the time period between signal values depending on the sampling frequency of the sensor. This sequence of signal values can be referred to as a signal-versus-time curve. The sequence of signal values can be expressed as a set of values $S_N$.

To establish a relationship of the signal strength to the polishing pad thickness, polishing pads of known thickness (e.g., as measured by a profilometer, pin gauge or the like) can be placed on the platen and the signal strength measured.

In some implementations, the signal strength from the sensor 102 is linearly related to the thickness of the polishing layer. In this case, the values Th=S or Th=A*S, where A is a constant to fit the function to the data of known polishing pad thicknesses.

However, the signal strength from the sensor 102 need not be linearly related to the thickness of the polishing layer. For example, the signal strength can be an exponential function of the thickness of the polishing layer.

An exponential function of thickness can then be fit to the data. For example, the function can be in the form $$S = Ae^{-B*Th}$$

where S is the signal strength, Th is the polishing pad thickness, and A and B are constants that are adjusted to fit the function to the data of known polishing pad thicknesses.

For the polishing pad that are later used for polishing, the controller 90 can use this function to calculate the polishing pad thickness from the signal strength. More particularly, the controller can configured to generate the measure of polishing pad thickness Th from an equivalent logarithmic function of signal strength, e.g., as follows $$Th = -\frac{1}{B}\ln\left(\frac{S}{A}\right)$$

However, other functions could be used, e.g., a second order or higher polynomial function, or a polyline. Thus, the sequence of signal values $S_N$ can be converted to a sequence of thickness values $Th_N$.

As noted above, the pad thickness measurements are subject to noise. In particular, noise can be introduced each time a new substrate begins polishing and each time the polishing system goes into a wet idle mode. However, the series of thickness measurements can be smoothed using a filter that incorporates linear prediction. This same filter can be used to calculate a current pad cut rate. Linear prediction is a statistical technique that uses current and past data to predict future data.

The controller 90 is also configured to generate a measure of the pad cut rate from the signal. This pad cut rate could be calculated by fitting a linear function to the measured pad thickness values $S_N$ over time. For example, the function could be fit to thickness values from a running window, e.g., the last N wafers, where N is selected depending on whether the operator desires to calculate a pad cut rate that is closer to an instantaneous cut rate or closer to an average pad cut rate. Smaller values of N are more reactive to noise. Larger values for N are less reactive but also less instantaneous. In some implementations, the running window is the last 3-30 measurements. For example, the running window can be 5-10 measurements.

Figure 5:
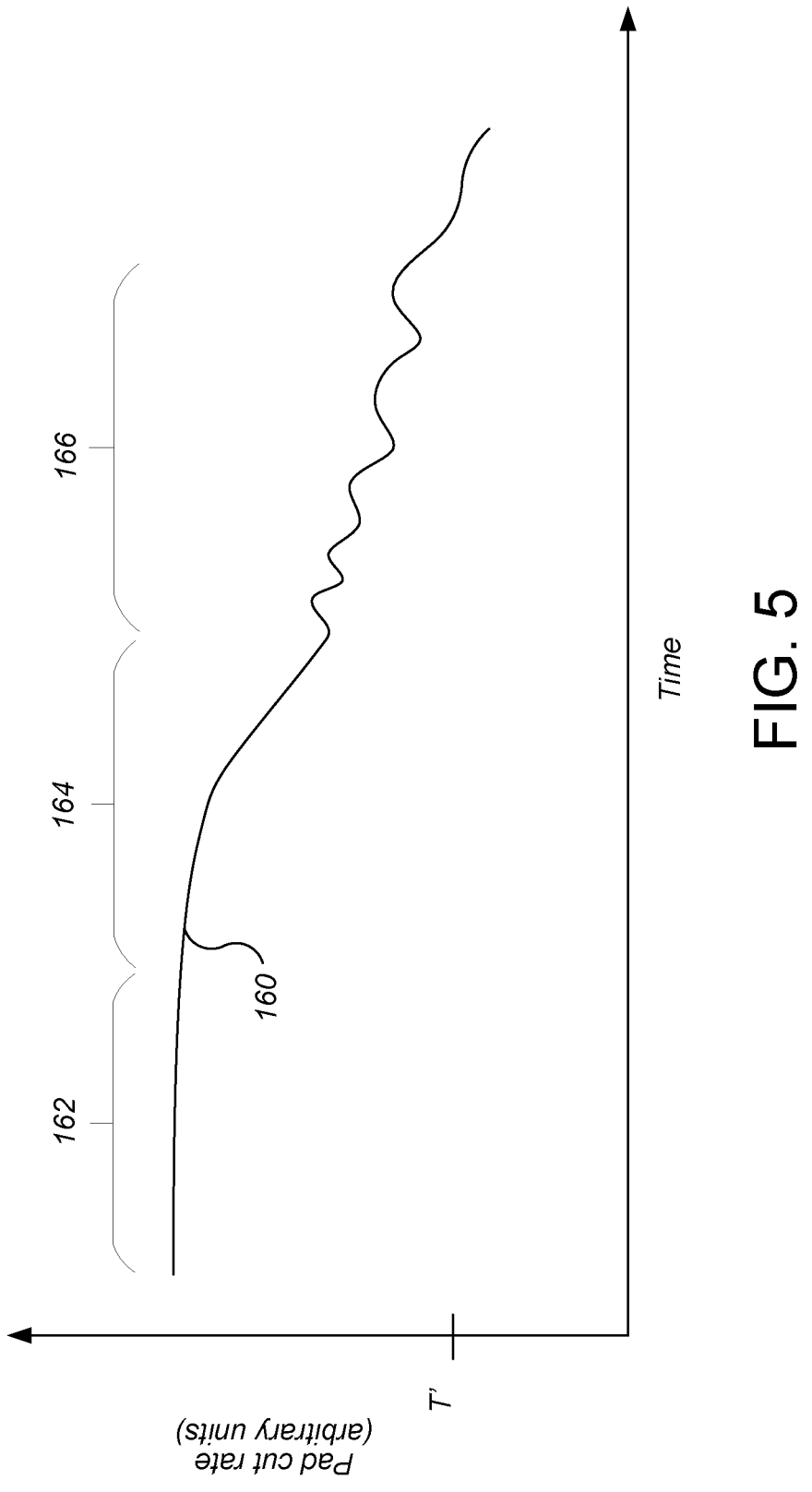
FIG. 5 is an illustrative graph of pad cut rate over time.

A possible illustrate of pad cut rate (graph line 160) over time is illustrated in FIG. 5. This graph would be over polishing of multiple substrates (not within polishing of a single substrate). As illustrated, the pad cut rate 160 can initially remain fairly flat (in region 162), e.g., after a fresh conditioner disk has been installed. However, after some time, the pad cut rate can begin to fall off (in region 164) as the conditioner disk is worn and loses sharpness.

When the measure of pad cut rate 160 falls below a threshold T', the controller 90 can generate an alert to the operator of the polishing system 20 that the conditioning disk 66 needs to be replaced.

In some implementation, the value of T' depending on the consumable set (e.g., different conditioning disks). For example, the controller can store a database that associates different values of T' with different consumable parts (e.g., different conditioning disks). The parts could be specified by manufacturer, brand and make, or part number (e.g., SKU). When an operator installs a new conditioning disk, the part identifying information can be entered into the controller 190. The controller 190 can then automatically set the threshold T' based on the input part identification.

Alternatively or in addition, the controller 90 can adjust the downforce from the conditioner head 62 on the conditioning disk 66 to maintain a constant polishing pad wear rate. It can be assumed that the wear rate is proportional to the downforce on the conditioning disk 66.

However, in some situations, even before the pad cut rate falls below the threshold T, the pad cut rate may undergo a period of increased variability (e.g., in region 166). This variation can indicate either a problem with the conditioner disk or some other problem in the polishing process. The variability (or non-uniformity over time) in the pad cut rate can be determined, e.g., by calculating a standard deviation of the pad cut rate measurements in a running window, e.g., the last M pad cut rate measurements. In some implementations, if the variability exceeds a threshold, the controller 90 can generate an alert. This can trigger the operator to replace the conditioning disk or otherwise check for problems in the polishing system.

Where the polishing system 20 includes an in-situ substrate monitoring system 40, the in-situ polishing pad monitoring system 100 can be a first electromagnetic induction monitoring system, e.g., a first eddy current monitoring system, and the substrate monitoring system 40 can be a second electromagnetic induction monitoring system, e.g., a second eddy current monitoring system. However, the first and second electromagnetic induction monitoring systems would be constructed with different resonant frequencies due to the different elements that are being monitored.

The in-situ polishing pad thickness monitoring system can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there can be a fluid bearing between the platen and polishing pad during polishing. The polishing pad can be a standard (e.g., polyurethane with or without fillers) rough pad, a soft pad, or a fixed-abrasive pad.

In addition, although the foregoing description focuses on monitoring during polishing, the measurements of the polishing pad could be obtained before or after a substrate is being polished, e.g., while a substrate is being transferred to the polishing system.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a non-transitory machine-readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for chemical mechanical polishing, comprising:
   a platen having a surface to support a polishing pad;
   a carrier head to hold a substrate against a polishing surface of the polishing pad;
   a pad conditioner to hold a conditioning disk against the polishing surface;
   an in-situ electromagnetic induction polishing pad thickness monitoring system comprising a sensor having a magnetic core; and
   a controller configured to receive a signal from the in-situ electromagnetic induction polishing pad thickness monitoring system, generate a measure of a pad cut rate from the signal, and determine a measure of variability of the pad cut rate over time from the signal, wherein the pad cut rate is indicative of an effectiveness of the conditioning disk in conditioning the polishing pad.

2. The apparatus of claim 1, wherein the controller is configured to generate an alert if the measure of variability exceeds a threshold.

3. The apparatus of claim 1, wherein the controller is configured to determine a measure of variability by calculating a standard deviation of the pad cut rate.

4. The apparatus of claim 3, wherein the controller is configured to calculate the standard deviation in a running window of measurements.

5. The apparatus of claim 4, wherein the running window of measurements is a running window of the last N measurements, wherein N is 3 to 30.

6. The apparatus of claim 5, wherein N is 5 to 10.

7. The apparatus of claim 1, wherein the magnetic core is held on the pad conditioner so as to generate a magnetic field to induce a current in the platen.

8. The apparatus of claim 1, wherein the pad conditioner comprises an arm extending over the platen and the magnetic core is supported on the arm of the pad conditioner.

9. The apparatus of claim 1, wherein the controller is configured to generate an alert if the pad cut rate falls beyond a threshold value.

10. The apparatus of claim 1, wherein the controller is configured to calculate the pad cut rate by applying a predictive filter to a sequence of pad thickness measurements of the signal, and calculating the pad cut rate using the predictive filter.

11. The apparatus of claim 1, wherein the magnetic core is held in a recess in the platen so as to generate a magnetic field to induce a current in the conditioning disk.

12. The apparatus of claim 1, wherein the magnetic core is held in a recess in the platen so as to generate a magnetic field to induce a current in a conductive body above the polishing pad.

13. The apparatus of claim 12, wherein the conductive body comprises the conditioning disk.

* * * * *